Aug. 2, 1932.  H. A. STONE  1,869,630
COATING MACHINE
Filed March 18, 1929   9 Sheets-Sheet 1
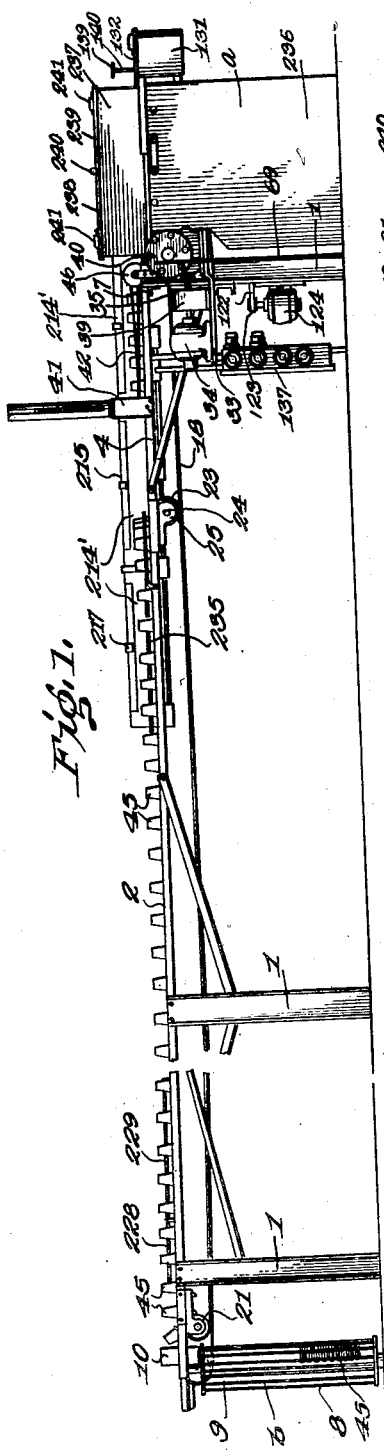
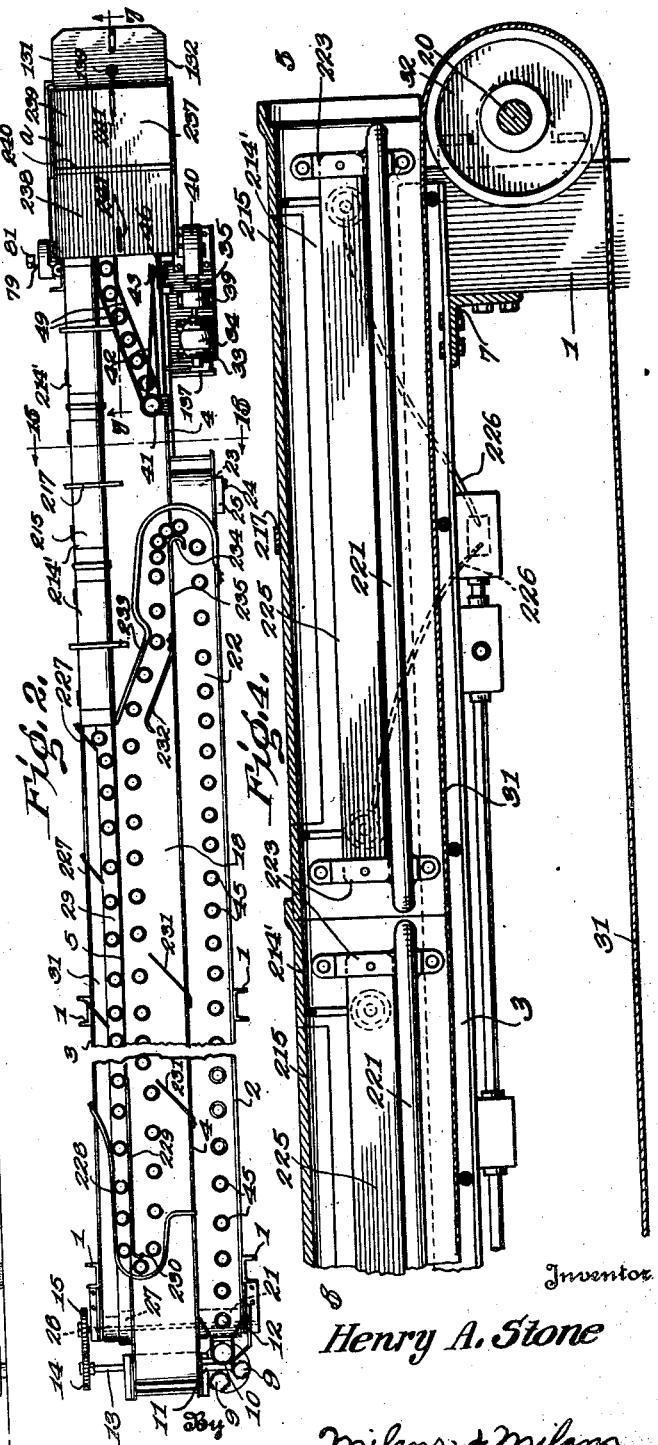
Inventor
Henry A. Stone
By Milans & Milans
Attorneys

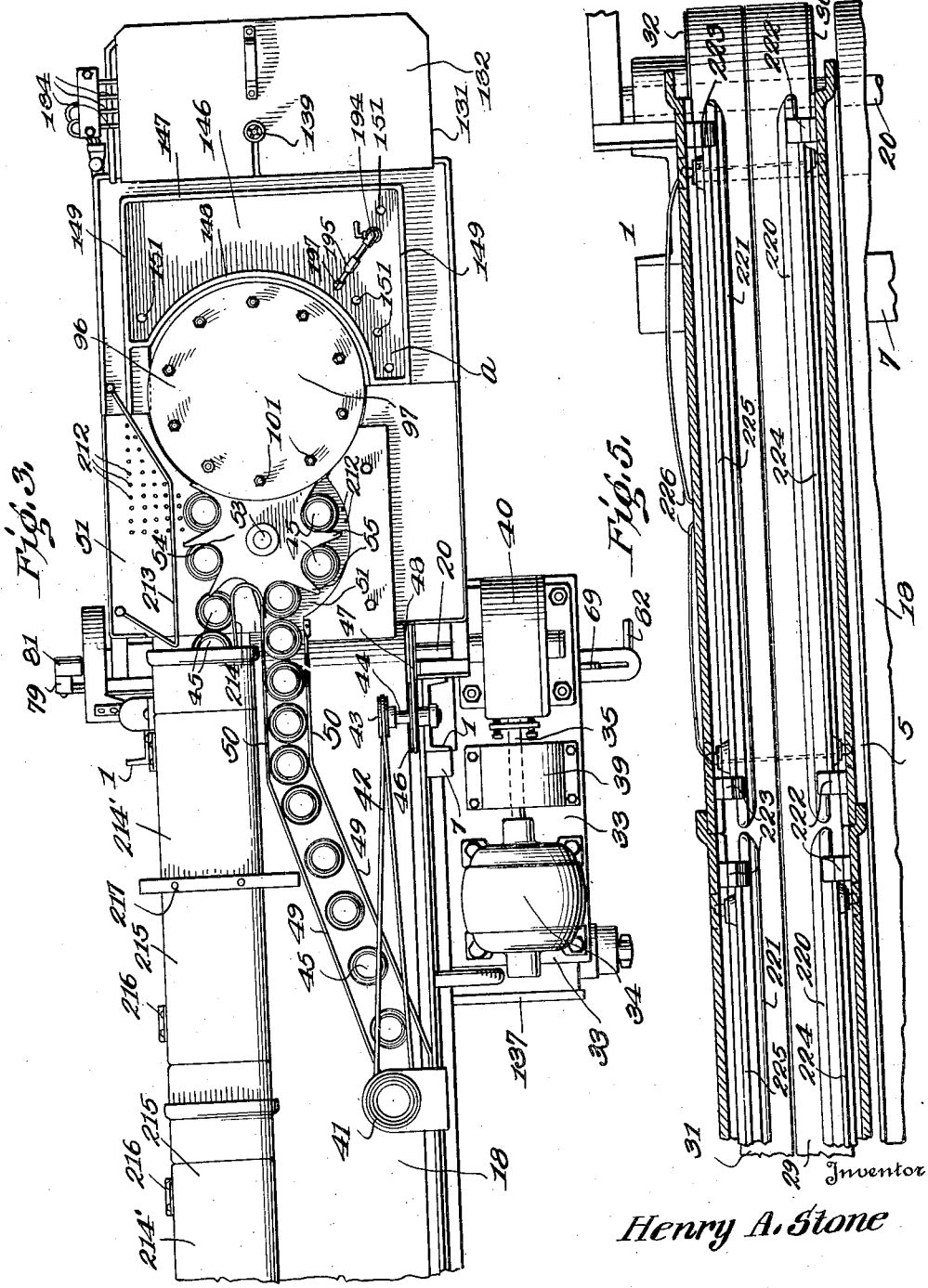

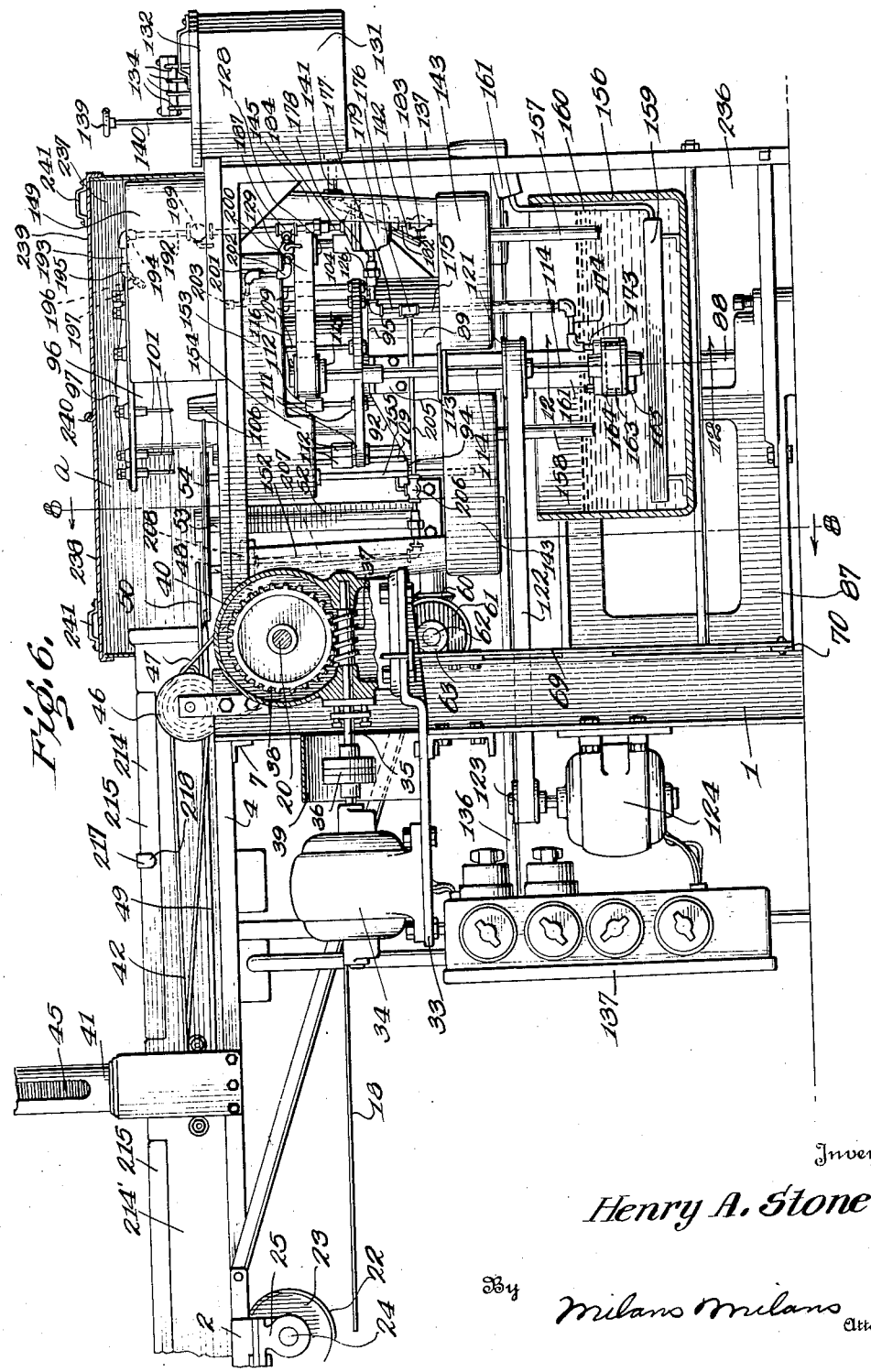

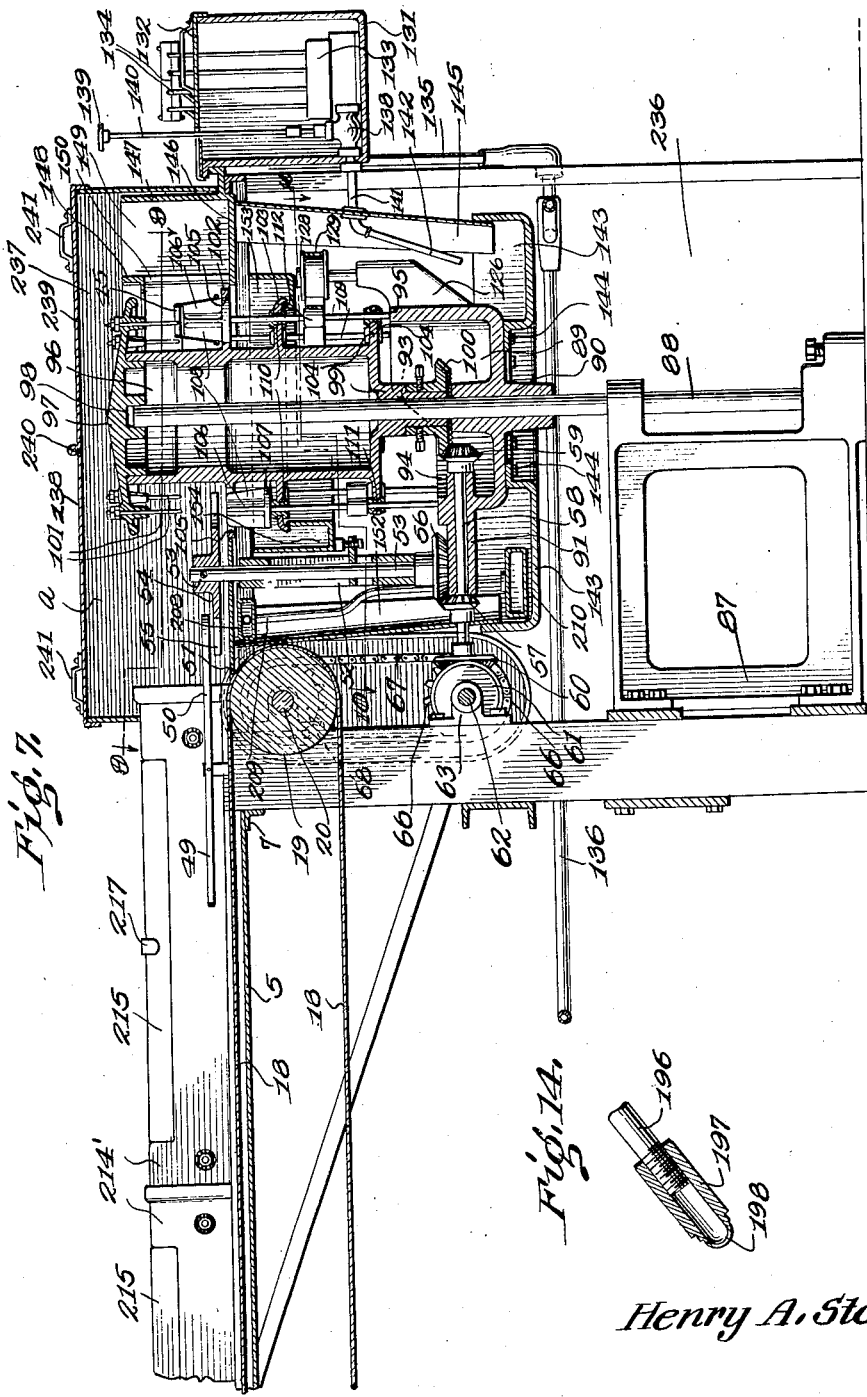

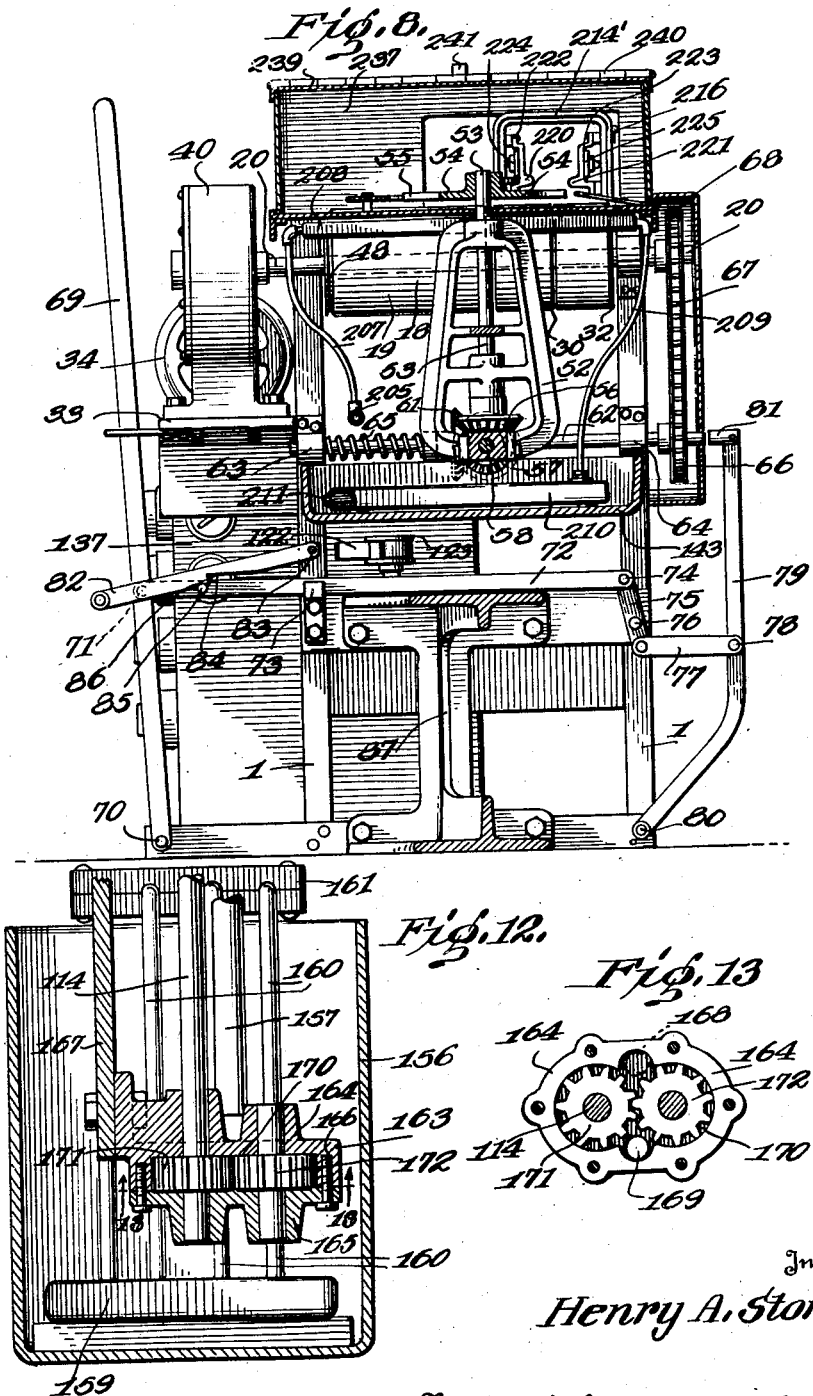

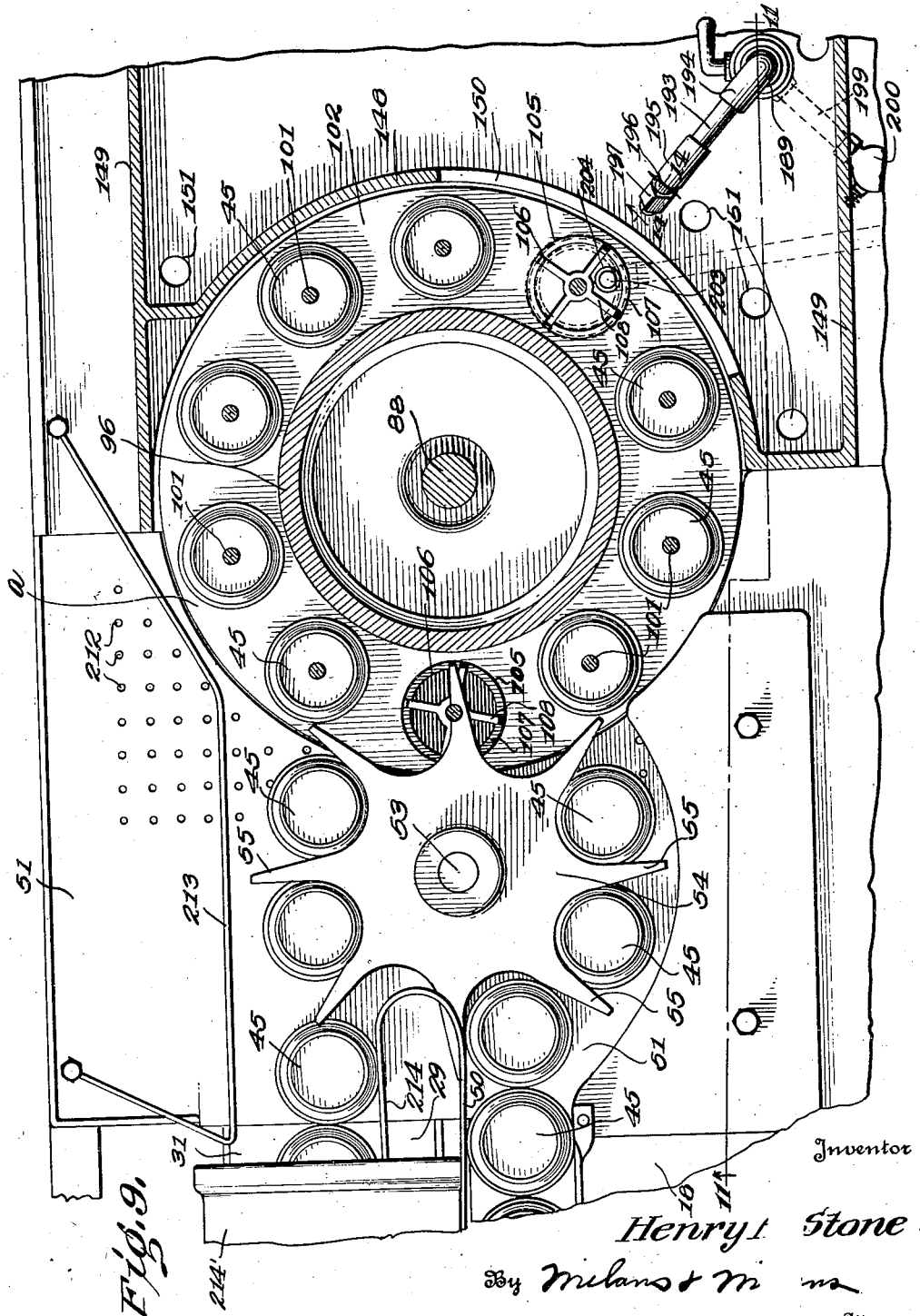

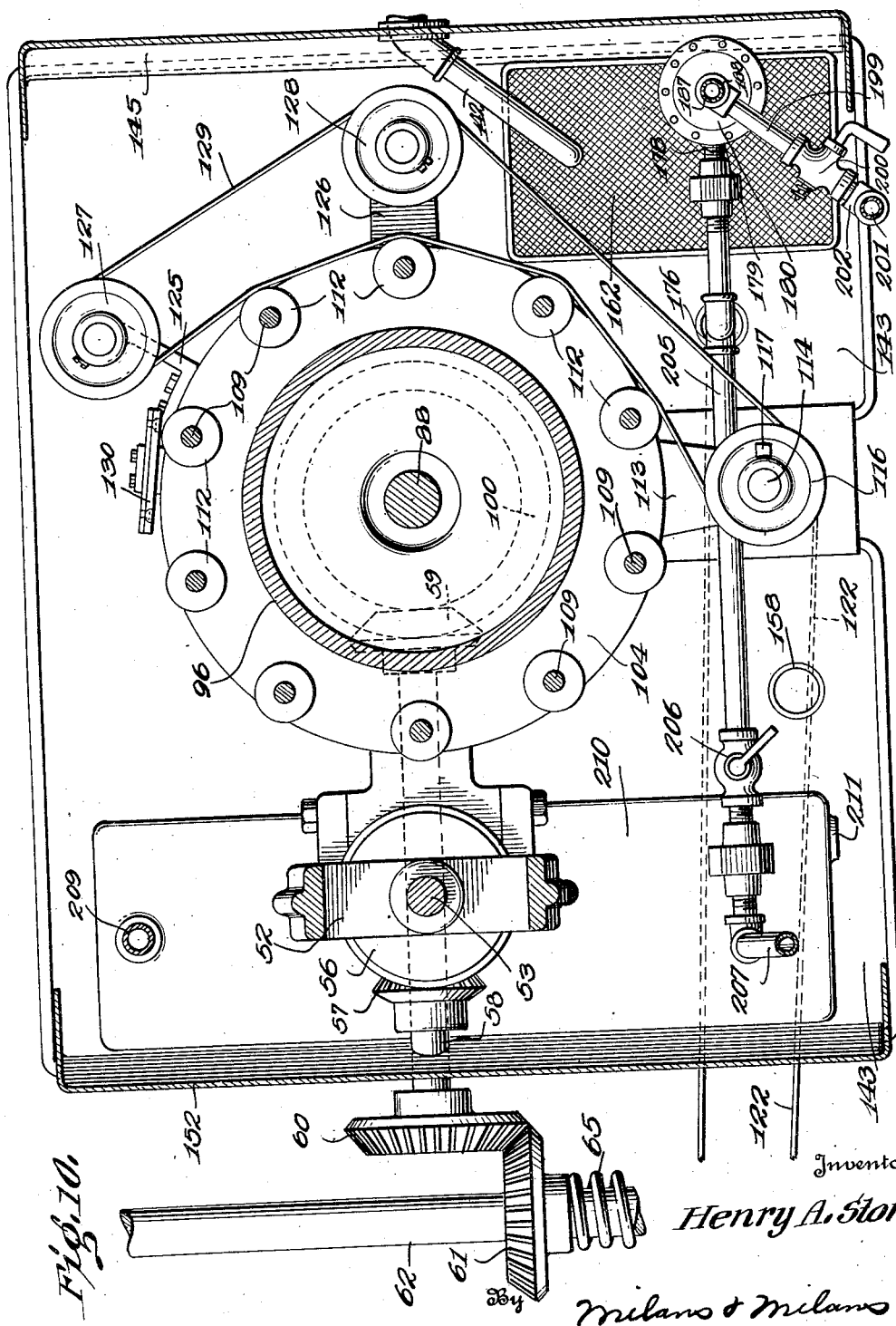

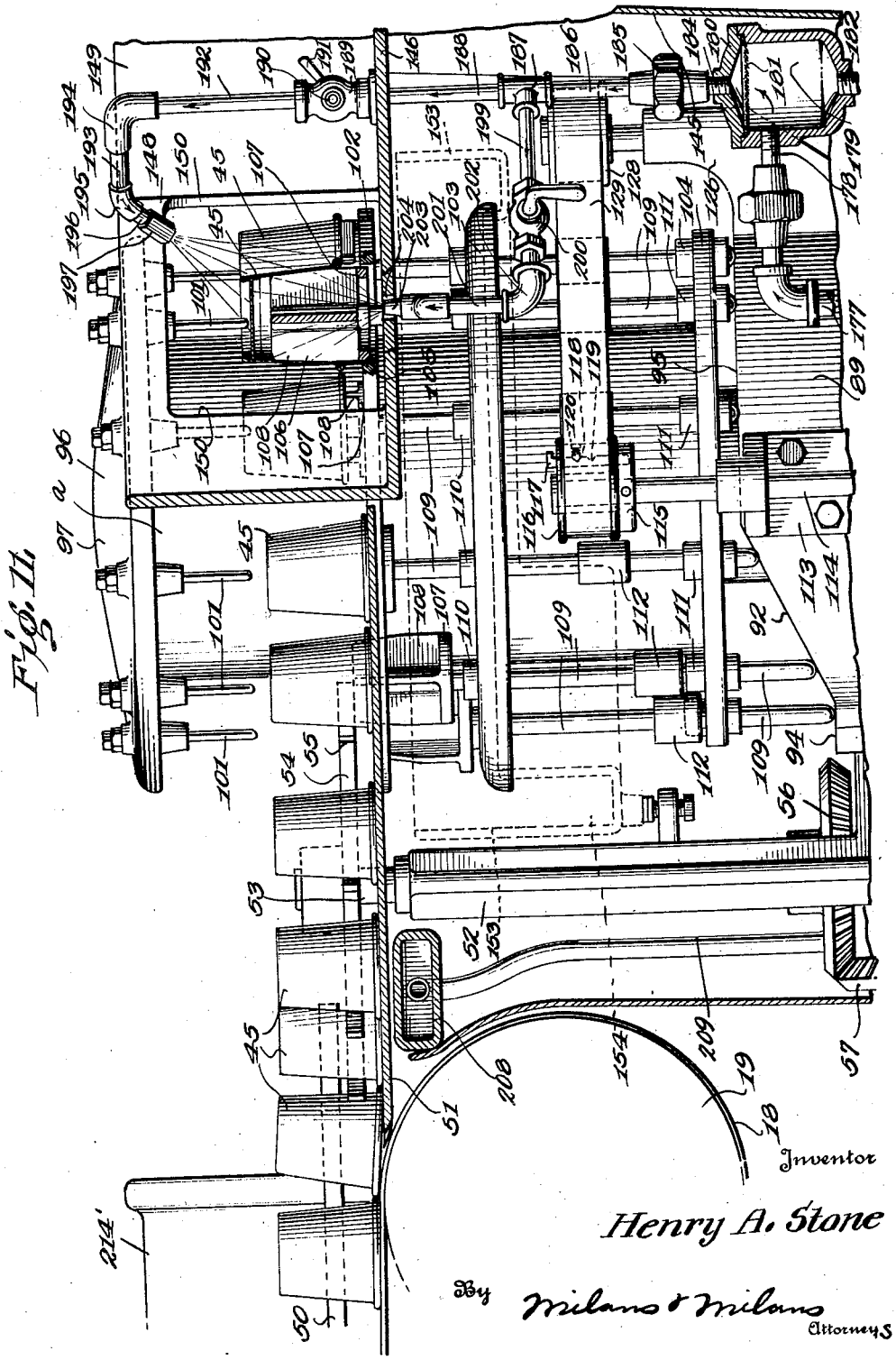

Aug. 2, 1932. H. A. STONE 1,869,630
COATING MACHINE
Filed March 18, 1929  9 Sheets-Sheet 9

Inventor
Henry A. Stone
By Milans & Milans
Attorneys

Patented Aug. 2, 1932

1,869,630

UNITED STATES PATENT OFFICE

HENRY A. STONE, OF EASTON, PENNSYLVANIA, ASSIGNOR TO INDIVIDUAL DRINKING CUP COMPANY, INC., OF EASTON, PENNSYLVANIA, A CORPORATION OF PENNSYLVANIA

COATING MACHINE

Application filed March 18, 1929. Serial No. 347,940.

My invention relates to new and useful improvements in a machine for treating containers or receptacles such as paper cups or the like and more particularly to a machine for coating the containers or receptacles with paraffin or a like waterproofing coating, means being provided whereby the containers or receptacles may be coated either interiorly or exteriorly or both interiorly and exteriorly.

Another object of the invention resides in the provision of a machine of the character described in which the receptacles or containers to be treated are deposited onto a conveyor from which they are transferred to a treating zone where the coating is applied and after being coated they are transferred from the treating zone onto another conveyor which carries them through a heated tunnel from which they emerge and are cooled to be finally conveyed to a point where they are deposited into a receiving rack, in nested stack formation, from which they may be removed to be placed into cartons or the like.

A further object of the invention consists in the provision of means whereby the containers or receptacles when in the treating zone are carried on a rotatable table which positions them to receive the coating of paraffin or the like, the individual receptacles or containers being also rotated while positioned to receive the coating whereby the coating will be equally distributed over the surface or surfaces thereof.

Still another object of the invention resides in the provision of means for rotating the individual containers and receptacles as they pass through the heated tunnel, this rotation of the containers or receptacles when passing through the heated tunnel presenting all surfaces thereof to the points of greatest heat and at the same time preventing the containers or receptacles from sticking or adhering to the conveyor or conveyors which carry them through the tunnel.

Still another object of the invention resides in the provision of a novel form of treating zone in which the containers or receptacles are conveyed and positioned in such a manner that the coating of paraffin or the like may be applied either exteriorly or interiorly or both exteriorly and interiorly in the form of a spray, means being provided for holding a main supply of the paraffin or the like and heating the same so that it may be deposited or discharged into a receptacle or tank where it is maintained in a liquid state by heaters and from which it is pumped and discharged through the spray nozzles, a portion of said heated paraffin or other compound being so circulated as to provide a heating medium at the point where the receptacles or containers are transferred from the conveyor to the treating zone, the heating at this point preventing the accumulation of waste material which would prevent the ready transfer of the conveyors or tainers from the conveyor to the treating zone.

It is a further object of the invention to provide novel means whereby the several parts of the machine may be operated to successively deposit the containers or receptacles, from a dispensing machine or the like, onto the conveyor which carries them to the treating zone, next apply the coating to the receptacles or containers, next convey the treated receptacles through the heated tunnel, and finally convey them to a point for deposit into a receiving rack from which they may be removed to be placed in cartons or the like.

With the above and other objects in view, which will appear as the description proceeds, my invention consists in the novel details of construction, and arrangement of parts, described in the following specification and illustrated in the accompanying drawings, and while I have illustrated and described the preferred embodiments of the invention, as they now appear to me, it will be understood that such changes may be made as will fall within the scope of the appended claims.

In the drawings:—
Fig. 1 is a side elevation.
Fig. 2 is a top plan.
Fig. 3 is a fragmental top plan with the cover removed from the paraffining or coating zone.

Fig. 4 is a fragmental longitudinal vertical section through a portion of the heated tunnel with parts shown in side elevation.

Fig. 5 is a horizontal section, at right angles to that shown in Fig. 4, with parts shown in top plan.

Fig. 6 is a fragmental side elevation of the paraffining or coating zone end of the machine with parts shown in section, one of the side plates being removed.

Fig. 7 is a longitudinal vertical section on the line 7—7 of Fig. 2 looking in the direction of the arrows.

Fig. 8 is a transverse vertical section on the line 8—8 of Fig. 6 looking in the direction of the arrows.

Fig. 9 is a horizontal section on the line 9—9 of Fig. 7 looking in the direction of the arrows.

Fig. 10 is a horizontal section on the line 10—10 of Fig. 7.

Fig. 11 is a longitudinal vertical section substantially on the line 11—11 of Fig. 9.

Fig. 12 is a detail showing a transverse vertical section on the line 12—12 of Fig. 6 looking in the direction of the arrows.

Fig. 13 is a horizontal section on the line 13—13 of Fig. 12 looking in the direction of the arrows.

Fig. 14 is a detail of one of the spray nozzles showing a longitudinal section on the line 14—14 of Fig. 9.

Figure 15:
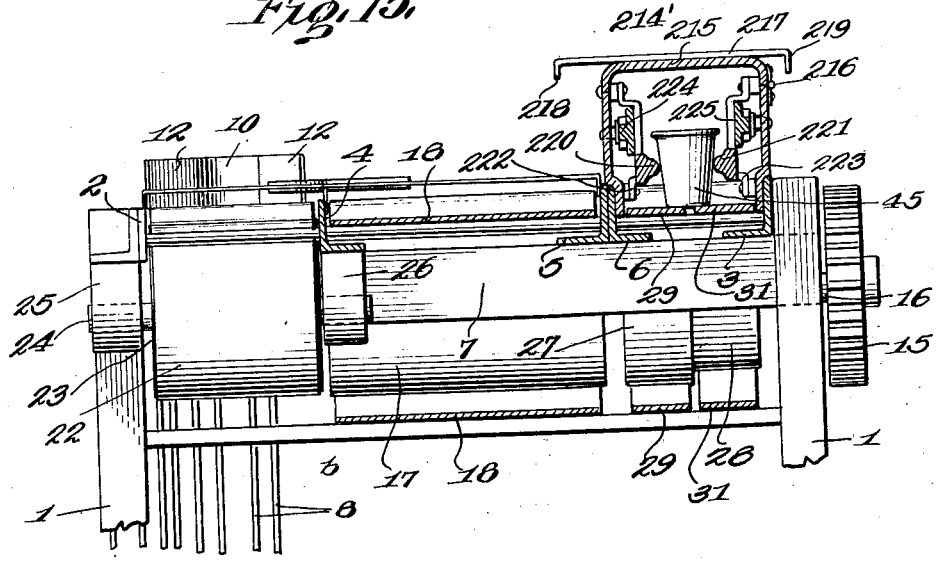
Fig. 15 is a transverse vertical section on the line 15—15 of Fig. 2 looking in the direction of the arrows.
Figure 16:
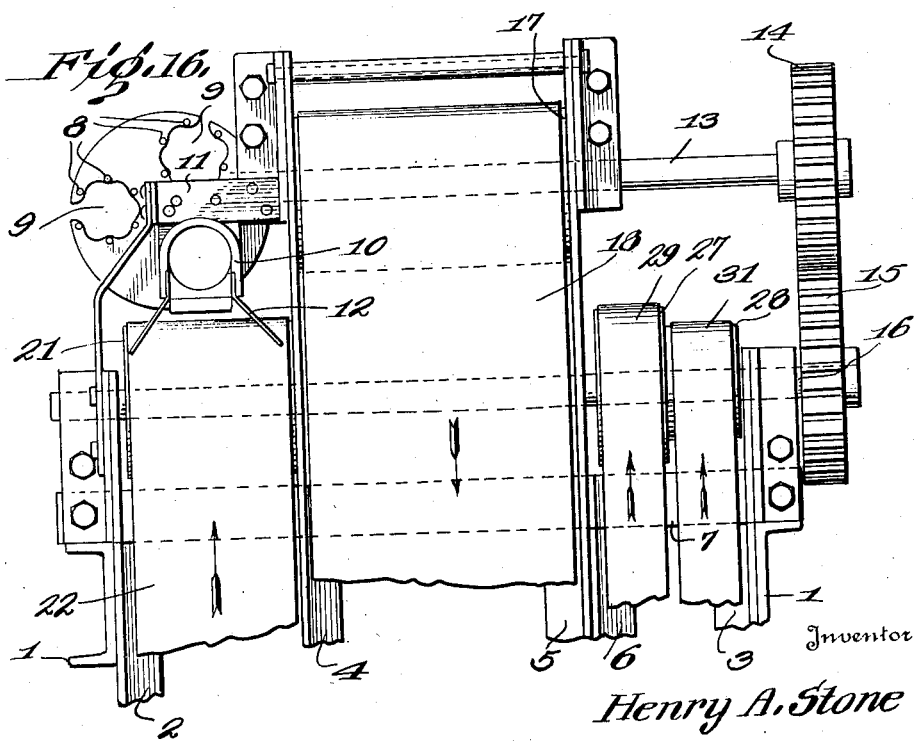
Fig. 16 is an enlarged fragmentary top plan of that end of the machine in which the containers or receptacles are finally deposited into the collecting rack.

In the drawings 1 indicates standards or legs which support a horizontal frame structure consisting of the angle iron side beams or rails 2 and 3 and intermediate beams or rails 4, 5 and 6 extending parallel with the beams 2 and 3, the rails or beams being transversely spaced as shown more particularly in Figs. 15 and 16 and connected by means of the transversely extending angle iron bars 7, said bars being longitudinally spaced. Positioned adjacent one end of the horizontal frame is the coating or paraffining zone $a$ while at the opposite end of the frame is positioned a receiving rack $b$ into which the treated cups are delivered in nested stack formation. This receiving rack is rotatable and consists of the vertically extending rods 8 which form the circumferentially spaced chutes or compartments 9 into which the cups or other receptacles or containers are discharged. When one chute or compartment has become filled the rack will be rotated to bring the next chute or compartment into alignment with the guide member or tube 10 which is secured to the horizontal frame by means of the bracket 11 as more particularly illustrated in Fig. 16 of the drawings, outwardly flared guide plates 12 being secured to the guide or tube 10 to guide the receptacles or containers, into the guide or tube in a manner which will be later described. Supported at that end of the frame, adjacent the receiving rack, is a transversely extending shaft 13 to one end of which is secured a gear wheel 14 which meshes with a gear wheel 15 carried by a shaft 16 which also is supported by the frame and extends transversely thereof. Supported by and keyed to the shaft 13, between the rails or beams 4 and 5, is a pulley or drum 17 around which operates one end of an endless belt or conveyor 18, the opposite end of the belt or conveyor operating around a pulley or drum 19 which is carried by and keyed to a shaft 20 extending transversely of the frame adjacent the coating or paraffining zone. Supported on, carried by and keyed to the shaft 16, between the side rail or beam 2 and the intermediate rail or beam 4 is a pulley or drum 21 around which one end of the endless belt or conveyor 22 passes, the opposite end of the belt or conveyor passing around the pulley or drum 23, said drum or pulley 23 being supported by and keyed to the shaft 24 mounted in the bearings 25 and 26 as shown more particularly in Fig. 15 of the drawings. Also carried by and keyed to the shaft 16, between the side rail or beam 3 and the intermediate rail or beam 6 are the pulleys or drums 27 and 28, the pulley or drum 28 being of somewhat less diameter than the pulley or drum 27, as shown more particularly in Figs. 15 and 16 of the drawings, the purpose of which will be presently described. Extending around the pulley or drum 27 is one end of the belt or conveyor 29, the opposite end of the belt or conveyor operating around a pulley or drum 30 carried by and loosely mounted on the shaft 20 which also supports the pulley or drum 19. One end of a belt or conveyor 31 operates around the pulley or drum 28 while the opposite end of the belt or conveyor operates around a pulley or drum 32 also supported by and loosely mounted on the shaft 20. In other words the pulleys or drums 30 and 32 are idlers and not keyed to the shaft 20. Mounted on a bracket 33, adjacent the paraffining or coating zone $a$, is an electric motor 34 which drives the shaft 35 through means of the coupling 36, the shaft 35 having the worm 37 meshing with the gear 38 secured to the shaft 20 which carries the pulleys or drums 19, 30 and 32. A guard 39 extends over the coupling 36 and the worm 37 and gear 38 are enclosed in a housing 40. It will thus be seen that the electric motor 34 drives the shaft 20 through the worm 37 and gear 38 and as the pulley or drum 19 is keyed to the shaft 20 it rotates therewith and drives the belt or conveyor 18 in the direction indicated by the arrows more particularly in Fig. 16 of the drawings. As the pulleys or drums 30 and 32 are loose on the shaft 20 they are not driven therewith but the belt or conveyor 18 will drive the pulley or drum 17 keyed to the shaft 13 and through means of the meshed gears 14 and 15 will drive the shaft 16 and pulleys or drums 21, 27 and 28 keyed thereto. The rotation of these drums 21, 27 and 28 will drive the belts or conveyors 22, 29 and 31 respectively in the direction indicated by the arrows in Fig. 16 of the drawings.

From the above it is thought that the arrangement of the belts on conveyors will be clearly understood as well as the manner in which they are driven.

At 41 I have illustrated any suitable means designed for dispensing paper cups or similar receptacles operated through means of a belt 42, the belt in turn being driven from a pulley 43 mounted on the shaft 44. The means 41 is positioned so as to drop the cups 45 or other receptacles onto the conveyor 18, as shown more particularly, in Figs. 2 and 3 of the drawings, the cups or receptacles being dropped at intervals so that normally they will be spaced apart. Mounted on the shaft 44, in spaced relation to the pulley 43, is a pulley 46 around which operates a belt 47 which is driven from the drum 19 having the groove 48 to receive the belt. It will therefore be seen that as the shaft 20 is operated it will in turn rotate the pulley 48 and through means of the belt 47 and pulley 46 drive the shaft 44. The shaft 44 in turn drives the pulley 43 and through means of the belt 42 operates the means for dispensing the cups or other suitable receptacles 45 and deposits them upon the conveyor 18 which operates in the direction indicated by the arrows more particularly in Fig. 16 of the drawings to carry the cups or receptacles towards the treating zone indicated generally at $a$. Overlying the conveyor 18 are the guide members 49 which direct the cups or receptacles, during their conveying movement, towards the opposite side of the conveyor and through the guide members 50 which extend longitudinally of the conveyor, as shown more clearly in Fig. 3 of the drawings. The cups or receptacles are deposited from the end of the conveyor onto the plate or platform 51 forming a part of the treating zone. Mounted in the bearing 52 is a vertically extending shaft 53 to the upper end of which is secured the disc 54 having the marginal outwardly extending arms 55 forming the recesses therebetween to receive the cups or other receptacles 45, as shown more particularly in Fig. 9 of the drawings, and adapted to move the cups or receptacles over the plate or platform 51 as the disc is rotated in a manner to be later described. Secured, preferably at the lower end of the shaft 53, is a beveled gear 56 which meshes with a beveled gear 57 which is keyed upon a horizontal shaft 58, as shown more particularly in Figs. 7 and 8 of the drawings. Secured to one end of the horizontal shaft 58 is a beveled gear 59 for a purpose to be later described and secured to the opposite end of the shaft is a beveled gear 60 which normally meshes with a beveled gear 61 which is carried by a slidable shaft 62 which extends at right angles to the shaft 58, as shown more particularly in Figs. 7 and 8 of the drawings. The slidable shaft 62 is mounted in the bearings 63 and 64 and surrounding the shaft between the bearings 63 and the beveled gear 61 is a coiled spring 65 which normally holds the beveled gear 61 in mesh with the beveled gear 60. Also mounted on and carried by the shaft 62 is a sprocket wheel 66 around which operates a sprocket chain 67 which also operates around a sprocket gear 68 carried by the driven shaft 20. It will thus be seen that through means of the sprocket chain 67 the shaft 62 is driven by the shaft 20 and as the beveled gear 61 meshes with the beveled gear 60 on the shaft 58 the shaft 58 will in turn be rotated and through means of the beveled gears 56 and 57 rotate the vertically extending shaft 53 and with it the disc 54 which feeds the cups or receptacles 45.

In order to disconnect the drive of the shaft 58 from the shaft 62 I provide the hand lever 69 which is pivotally connected to the base of the machine at 70, as shown more particularly in Fig. 8 of the drawings. Pivotally connected at 71 to the lever 69 is a bar or link 72 which extends horizontally, as shown in Fig. 8, and operates in the guide member 73. The opposite end of this link or bar 72 is pivotally connected at 74 to the swinging arm 75 pivotally mounted at 76 and connected to this arm 75, below the pivot point 76, is a link 77 which is pivotally connected at 78 to the lever 79 which in turn is pivotally connected at 80 to the base of the machine. Secured at the upper end of the lever 79 is a projection 81 which is in alignment with the end of the shaft 62 as also more clearly shown in Fig. 8. Normally the parts are held in the position as shown in Fig. 8 and the inner end of the projection 81 is spaced from the end of the shaft 62. To disconnect the drive and to remove the beveled gear 61 from mesh with the beveled gear 60, the lever 69 is grasped and moved to the right of the position shown in Fig. 8. This movement of the lever will slide the link or bar 72 and through means of the connecting arm 75 and the link 77 draw the lever 79 towards the left. This movement will engage the end of the projection 81 with the end of the shaft 62 and slide the shaft 62 against the action of the coiled spring 65. The coiled spring will be placed under tension and the gear 61 will be moved from mesh with the beveled gear 60. With the gears out of mesh the shaft 58 will not be rotated. As the coiled spring 65 will have a tendency to urge the gears back into mesh it is necessary that I provide some means for holding the parts with the gears out of mesh. To accomplish this I provide the latch member 82, which is pivotally connected at 83 to the frame of the machine. The latch is provided in its bottom surface with a notch 84 which is adapted to receive the pin 85 carried by the link or bar 72. When the lever 69 is moved in position to disengage the gears the latch member 82 will drop and the pin 85 will be received in the notch 84 and engage the shoulder 86 formed thereby. This engagement of the pin with the shoulder of the latch member will hold the bar or link 72 against return to its normal position or in other words will hold the beveled gear 61 out of mesh with the beveled gear 60. When it is again desired to secure the drive of the shaft 58 the outer or free end of the latch member 82 will be raised to release the pin 85 from the shoulder 86 and the coiled spring 65 will slide the shaft 62 towards the right of Fig. 8 of the drawings and bring the gears into mesh. This same movement will cause the lever 79 to be swung outwardly on its pivot 80 and this movement in turn, through means of the link 77 and arms 75, will slide the connecting link or bar 72 towards the left of the figure and return the lever 69 to its original position.

Supported by the bracket 87, as shown more particularly in Fig. 7 of the drawings, is a vertically extending shaft 88 which extends parallel with the shaft 53. This shaft 88 is supported so as not to rotate and carries the member 89, having the bearing portion 90, through which the shaft 88 extends, and the horizontally extending portion 91 which forms a bearing for the shaft 58. The member 89 is formed with the beveled surfaces 92 and 93 and the flat portions 94 and 95 for a purpose which will be later described. Rotatably mounted on the shaft 88 is a turret 96 which has a top 97 provided on its under surfaces with a recess 98 to receive the upper end of the shaft 88. A projection 99 extends downwardly from the bottom of the turret and has secured thereto a beveled gear 100 which meshes with the beveled gear 59 on the inner end of the horizontal shaft 58. The turret is rotated by the shaft 58 and the meshing beveled gears 59 and 100. Carried by the top 97 of the turret and depending therefrom are the circumferentially spaced pins 101 for a purpose which will be presently described. As shown more particularly in Figs. 7 and 11 of the drawings these downwardly extending pins 101 are spaced from the outer face of the body portion of the turret.

Formed on the turret 96 and extending outwardly therefrom are the vertically spaced horizontally extending flanges 102, 103 and 104, the flange 102 being provided with the circumferentially spaced openings 105 of a diameter to allow the cup carrying members 106 to readily pass therethrough when moved vertically as quite clearly shown in the drawings. The cup carrying members 106 include the base portion 107 and the vertically extending wings 108 which are of a shape to conform to the interior of the cup 45 or other container received thereon. The base is formed with openings positioned between the wings 108. Normally the cup carrying members are positioned with their upper ends extending into an opening 105 in the flange 102 with the upper end of the carrier flush with the top surface of the flange so that the cup may be positioned on the flange by means of the disc or plate 54, as shown more particularly in Figs. 7 and 9 of the drawings. Depending from each of the cup carriers 106 is a rod 109, these rods 109 passing through bearings 110 and 111 carried respectively by the flanges 103 and 104 of the turret. Normally, when the cup carriers 106 are lowered, the base of the carriers will rest upon the top of the bearings 110, as shown more particularly in Fig. 7 of the drawings. The lower ends of the rods 109 normally rest upon the flat surface 94 of the member 89 and secured to each of the rods is a pulley 112, these pulleys being arranged above the flange 104 are adapted to normally rest, when the rods are in lowered position, on the bearings 111. As has been previously stated, as the cups 45 pass from the conveyor 18 to a position upon the plate 51 they are engaged by the arms 55 of the disc 54 and by rotation of the disc are carried to a position on the flange 102 over the openings 105. In other words the cups received on the flange 102 are positioned thereon with their open ends over the openings 105 and in alignment to receive the carriers 106 as the same are raised. The turret 96 being rotated causes the lower ends of the rods 109 to engage the inclined surface 92 of the member 89 and raise the rods 109 and the cup carriers 106 carried thereby. This movement of the cup carriers engaging interiorly of the cups will cause the cups to be raised from the flange 102 and the ends of the rods after passing up the incline 92 are received on the flat surface 95 of the member 89. While the ends of the rods are on the flat surface 95 the cups will be held with their lower ends spaced above the flange 102 so that the cup carriers may be rotated, with the cups thereon, in a manner which will be now described. When the carriers, with the associated cups, are in raised position the lower ends of the pins or members 101 will be positioned adjacent the inverted bottom of the cup, as shown more particularly in Fig. 11 of the drawings so that as the cups are rotated they will not be thrown from their carriers.

Rotatably mounted in the bracket 113 is a shaft 114 and secured adjacent the upper end of this shaft is a plate 115 forming a bearing for a pulley 116 loosely mounted on the shaft. A slidable key 117 is carried by the pulley 116 and is adapted to have its lower end received in a recess formed in the upper surface of the plate 115 whereby the pulley 116 will be coupled to the plate 115 and rotate therewith. When the key 117 is raised and its lower end released from the recess in the plate 115 the pulley 116 will be disconnected from the plate 115 and will be free on the shaft 114. The key 117 is formed in one edge with the notches 118 and 119 and a spring pressed member 120 is adapted to be received in either one of these notches to hold the key in either its raised or lowered positions. When the key is in lowered position the spring pressed member 120 will be received in the notch 118 but when the key is raised the spring pressed member will be received in the notch 119. This coupling is quite clearly illustrated in Fig. 11 of the drawings and the purpose thereof will later be brought out more in detail. Connected to the shaft 114, intermediate the ends thereof, is a pulley 121 around which operates a belt 122 operated from a pulley 123 driven by the electric motor 124. Supported by the brackets 125 and 126, respectively, are the pulleys 127 and 128 which are on the same plane. A belt 129 is trained around the pulleys 116, 127 and 128, as shown more particularly in Fig. 10 of the drawings and the inner flight of the belt is positioned so as to be engaged by the pulleys 112 when the cup carriers 106 are raised. The electric motor 124, through means of the belt 122, rotates the shaft 114 and when the pulleys 116 are coupled to the shaft, by means of the key 117, the belt 129 will be operated and will rotate those pulleys 112 which are in engagement with the inner flight thereof as shown more particularly in Fig. 10 of the drawings and through means of the pulleys 112 the shafts or rods 109, supporting the cup carriers, will be rotated and the cups carried by the carriers will be given a rapid rotary movement to receive the paraffin coating in a manner to be later described. At 130 I have illustrated braking mechanism to retard or stop the rotation of the cup carriers prior to the time that the coated cups are to be removed from the turret. This braking member includes a relatively flat surface which is adapted to be engaged by the pulleys 112 after the turret has rotated sufficiently to remove the pulleys from contact with the inner flight of the belt 129. It will be understood that through operation of the belt 129 the rotative speed of the cup carriers is relatively high during the time that the coating composition is being applied to the cups. The speed of rotation of the turret itself is relatively low and it is advisable or necessary to retard the rotative movement or stop the rotation of the carriers prior to the time that the cups are to be removed from the turret.

At 131 I have provided a receptacle or container for the main supply of paraffin, preferably originally, in cake form and this receptacle or container is provided with the removable cover 132 whereby the supply of the paraffin or the like may be replenished. Within the receptacle or container 131 is placed an electric heater 133 and at 134 I have illustrated the wire conduits leading to the heater, these wires being conducted through the conduits 135 and 136, the conduit 136 leading to the switch box indicated generally at 137 and provided with the necessary number of switches for properly controlling the several heaters and the electric motors. A valve 138 is positioned at the bottom of the receptacle or container 131 and this valve is controlled through means of the hand-hold 139 from which leads a rod 140 connected to the valve. It will be understood that after the paraffin or the like has been melted that it will pass through the valve 138, when the same is open, and will flow through the pipe 141 which leads from the valve, through a side wall of the receptacle or container, and through means of the downwardly directed portion 142 delivered into a pan 143 which is connected to the bottom of the member 89, as shown more particularly in Fig. 7 of the drawings, by means of the bolts 144 or other suitable fastenings. The pipe 141 passes through the apron 145 which extends downwardly from the plate 146 which is positioned adjacent the outer periphery of the flange 102 of the turret 96. This plate 146 has the upwardly extending rear wall 147, front wall 148, and end walls 149 the front wall 148 being formed with an elongated opening 150 through which a spray of the coating material will be directed or discharged in a manner to be later described. Perforations 151 are formed in the plate 146 and allow surplus of the coating material, which may accumulate on the plate 146 to pass back into the pan or tray 143, this return of the surplus being directed by the apron 145 which also prevents splashing of the coating fluid from the pan 143 when the same is directed into the pan through the extension 142 of the pipe 141. An apron 152 is positioned at the opposite side of the pan 143 to also direct surplus of the coating material back into the pan 143. A collecting pan for the waste or surplus of the coating material is shown at 153 and is formed with a portion extending beneath the flange 103 of the turret 96, as shown more particularly in Fig. 7 of the drawings. This pan will receive the surplus of waste from adjacent the top of the machine and the pan is provided with a depressed or lower portion 154 into which the material will drain and is delivered back into the pan 143 through the pipe 155. At 156 I have shown a receptacle or container which is adapted to receive the coating composition from the pan 143 through the pipes 157 and 158. This receptacle or container 156 is adapted to hold a relatively large amount of the composition or compound which is adapted to be pumped therefrom, in a manner to be later described, to be sprayed upon the cups. Positioned within this receptacle or container 156 is an electric heater 159 to which lead the wire conduits 160 forming the heating elements. These wires preferably also come through the conduit 136 and a branch therefrom to the juncture 161. Positioned in the pan 143, below the pipe 142 which delivers the coating composition or liquid into the pan, is a strainer 162 which will strain from the composition any large particles, or impurities before the composition is delivered into the pan 143 and from the pan 143 through the pipes 157 and 158 into the receptacle 156.

As has been previously stated the liquid composition is adapted to be pumped from the receptacle 156. This pump is shown generally at 163 and consists of the top section 164 and bottom section 165 connected together by means of the screws 166 or other suitable fastenings. The pump is supported by the bracket 167 and the bottom section 165 is provided with an opening 168 while the top section 164 is provided with an opening 169. The top section 164 is formed in its bottom surface with a recess 170 in which is received the toothed wheels 171 and 172, the teeth of which intermesh, as shown more particularly in Figs. 12 and 13 of the drawings adjacent the transverse center line. The gear 171 is keyed to the shaft 114 which is driven in the manner previously described from the motor 124 by the belt 122 and the rotation of the toothed wheel 171 due to the intermeshing of the teeth thereof with the toothed wheel 172, drives the wheel 172. The rotation of the wheels, in the direction indicated by the arrows in Fig. 13 draws the coating composition from the receptacle or container 156 through the opening 168, formed in the bottom section of the pump, and forces the same through the opening 169 extending from the top section of the pump. A pipe 173 is connected in and leads from the opening 169 and is connected by means of the branch pipe 174 to the vertically extending pipe 175 to the upper end of which is connected the coupling 176. Connected to and leading from the top opening of the coupling is a pipe 177 which in turn is connected to the horizontally extending pipe 178 which leads to and communicates with the strainer or trap 179. This strainer or trap is provided with the removable cover 180 and a straining screen 181 is supported in the strainer or trap, as shown more particularly in Fig. 11 of the drawings, and positioned above the point where the pipe 178 leads into the strainer or trap. Leading from the bottom of this strainer or trap is a drain pipe 182 controlled by means of the valve 183. The cover or top 180 is formed with a screw threaded opening to receive the lower end of a pipe 184 to which a coupling 185 is connected. A pipe section 186 leads from the coupling 185 to the coupling 187 and from the top of the coupling 187 extends a pipe 188 leading to a valve casing 189 in which is received a rotatable valve 190 controlled by the handle 191. Leading from the valve casing 189 is the vertically extending pipe 192 which is connected to a substantially horizontally extending pipe section 193 by means of the angle coupling 194. Connected to the pipe section 193 is a coupling 195 which, as shown more particularly in Fig. 11 of the drawings, is curved and receives a pipe section 196 to which is connected a spray nozzle 197. The fact that the coupling 195 is curved directs the pipe 196 downwardly and the spray nozzle 197 is so positioned as to direct the coating composition through the opening 150 formed in the front wall 148 extending upwardly from the plate 146. The spray nozzle 197 is provided, in its outer end, with the opening 198 of a shape so as to direct the coating composition sprayed therethrough on the outer side surface of the cup or receptacle as well as on the outer surface of the bottom as shown quite clearly in Fig. 11 of the drawings. It will be appreciated that the discharge of the coating composition from the spray nozzle 197 may be controlled by the valve 190 operated by the handle 191. Connected to and leading from the coupling 187 is a horizontally extending pipe 199 through which passage of the coating composition is controlled through means of the valve 200. A vertically extending pipe 201 is connected to the end of the pipe 199 by means of the angle coupling 202 and to the upper end of the pipe 201 is connected a spray nozzle 203, by means of suitable intermediate pipe sections and couplings, the end of the nozzle extending through an opening 204 formed in the plate 146 and so positioned as to direct the spray of the coating composition interiorly of the cup or receptacle as it passes over the plate in the manner previously described. As has been stated the receptacle is rapidly rotated while the coating is being sprayed thereon and therein so that the entire surfaces of the cup or receptacle will be covered with the composition. By spraying the composition in the manner just described it will be received on the cup or receptacle in a flaky form due to the fact that as the hot composition passes from the spray nozzles it will be slightly cooled or crystallized. After being placed on the cup or receptacle in flaky form the cup or receptacle will be passed through a heated tunnel to be later described, so that the composition will flow and entirely coat the surfaces.

By controlling the valves 190 and 200 the composition may be sprayed both exteriorly and interiorly of the cup or receptacle or, if desired, only the outer surface or only the inner surface may be coated at will.

Leading from the coupling 176, connected to the pipe 175 is a horizontally extending pipe 205, intermediate the ends of which is a valve 206. Connected to that end of the pipe 205, opposite to that connected to the coupling 176, is a vertically extending pipe 207, the upper end of the pipe 207 being connected to and communicating with a heater 208 which extends beneath the plate 51, as shown more particularly in Figs. 8 and 11 of the drawings. Connected to and leading from the opposite end of the heater 208 is a pipe 209, the lower end of which is connected to and communicates with a heater 210, adjacent one end thereof, positioned within the pan 143. The heater 210 is provided in its opposite end with an outlet 211. It will be understood that a certain amount of the heated coating composition pumped through the pipe 175 will pass through the horizontal branch pipes 205 and 207 into the heater 208 and the heat from the heater will cause any of the composition which might accumulate on the upper surface of the plate 51 to remain in fluid condition so as not to interfere with the passage of the cups or receptacles thereover. If the coated composition, which accumulates on the top of the plate 51, should be allowed to cool it would cake thereon and interfere with the movement of the cups or receptacles. The heated composition is discharged from the heater 208, through the pipe 209, into the heater 210 and as said composition retains a certain amount of its heat it will aid in keeping the composition in the pan 143 in fluid condition. From this description it will be seen that the coating composition also acts as a heating medium.

The plate 51 upon which the receptacles or containers are initially delivered from the conveyor belt is provided with a plurality of perforations 212, as shown more particularly in Figs. 3 and 9 of the drawings, so that any surplus of the coating composition received upon the plate is drained back or returned into the pans or containers receiving the coating composition.

Up to this point I have described the manner in which the receptacles or containers are delivered to the conveying belt 18, the manner in which the containers or receptacles are transferred from the conveyor belt to the paraffining or coating zone, the manner in which the containers or receptacles are treated while in said zone, and the manner in which the rotative movement of the carriers for the containers or receptacles are retarded or stopped after the receptacles or containers have received the coating composition. I will now proceed to describe the manner in which the receptacles or containers are removed from the treating zone, how they are carried through a heating tunnel, and how they are conveyed from said heating tunnel for delivery into a receiving rack from which they may be removed to be placed in cartons or the like.

After the turret 96 has reached that point in its rotation that the rotative movement of the receptacle or container carriers is retarded or stopped by means of the braking mechanism 130 then a further rotation of the turret will allow the lower ends of the rods 109 to pass over the inclined surface 93 of the member 89 so that the carriers will drop into their original or lowered positions with the ends of the rods 109 riding over the flat surface 94 of the member 89. When the carriers are thus lowered they will be positioned beneath the top surface of the flange 102 of the turret and the receptacles or containers will be received upon the flange and positioned so as to be engaged by the arms 55 of the rotatable plate 54, as shown more particularly in Fig. 9 of the drawings. The rotation of the plate 54 causes the containers or receptacles to be removed from the flange 102 of the turret and again carried over the plate or surface 51 upon which they are initially delivered by the conveyor belt 18 and in position to be carried through the heating tunnel to be described. At 213 I have shown a guard or guide member positioned relative to the rotatable plate 54 to prevent the containers or receptacles from being moved to such a position that they would not be operated upon by the arms 55 and at 214 I have illustrated a guide arm which is a continuation of the guide 50 which engages the containers or receptacles and removes them from the rotatable plate 54, as shown more particularly in Fig. 9. The containers or receptacles on leaving the plate 51 are deposited upon the belts or conveyors 29 and 31 and will initially span or overlap the adjacent edges of these belts or conveyors, as shown more particularly in Figs. 2 and 15 of the drawings. These belts or conveyors 29 and 31 carry the receptacles or containers away from the treating zone and as the belt or conveyor 29 operates at a greater speed than the belt or conveyor 31, due to the difference in size of the pulleys or drums 27 and 28, the receptacles or containers will be given a rotative movement during the period that they are being conveyed through the heating tunnel or during the time that the receptacles or conveyors overlap or span the adjacent edges of the belts or conveyors.

The heating tunnel consists of a plurality of sections 214′ each of which is provided with a movable top 215 hinged at 216. Secured to each of the movable covers 215 is a transversely extending bar 217 having the ends bent downwardly, as shown at 218 and 219. This bar acts as a handle for raising and lowering the top 215 and the downwardly turned portion 219, when the top or cover is raised, will engage the side of the section of the tunnel to limit the upward swinging movement of the cover. Extending longitudinally through the tunnel are the guide bars 220 and 221 supported respectively by the brackets 222 and 223, as shown more particularly in Fig. 15 of the drawings. These guide bars are spaced apart, as shown, so that the receptacles or containers pass therebetween and are engaged thereby and positioned upon the belts or conveyors 29 and 31. Also supported by the brackets 222 and 223 respectively are the conductor bars 224 and 225 which carry an electric current and act as heaters for the tunnel. These heaters or conductor bars 224 and 225 are supplied with current through means of the conductor wires 226 leading to a suitable source of supply controlled through means of the switches carried by the switch box 137 previously described. As previously stated, as the receptacles or containers are carried through the heating tunnel they are given a rotatable movement due to the different speeds of the conveyor belts so that all sides or surfaces of the receptacles or containers are equally disposed to the heating bars. The heat causes the coating composition, which has been applied to the receptacles or containers in a flaky or powdered form, to flow sufficiently to entirely coat or cover the receptacle or container and to provide a smooth even surface or coating thereon. As shown more particularly in Fig. 15 of the drawings the sections of the tunnel are supported by the rails 3 and 6 of the frame of the machine.

As the containers or receptacles leave the end of the heating tunnel, furthest removed from the heating zone, they will engage the resilient arms 227 which overlie the belt or conveyor 31, as shown more particularly in Fig. 2 of the drawings and these arms will cause the containers or receptacles to be moved over to be received entirely upon the belt or conveyor 29. They are then conveyed by the conveyor or belt 29 between the guide arms or bars 228 and 229 and around the end 230 of the guide bar or arm 229 to be positioned upon the belt or conveyor 18. They are then carried by the belt or conveyor 18 towards the heating zone and the resilient arms 231 position them in line so that they will be fed by the belt or conveyor between the guides 232 and 233 and then around the end 234 of the guide 235 to position them upon the belt or conveyor 22 which is operated in a direction opposite to that of the belt or conveyor 18, or in other words in a direction to carry the receptacles or containers towards that end of the machine away from the treating zone. The belt or conveyor 22 carries the receptacles or containers to position between the guide plates 12 which guide them to the guide member or tube 10 through which they are delivered into the compartment or compartments of the receiving rack. It will be understood that the receptacles or containers are delivered upon the belt 18 in an inverted position or with their open end downwardly and are also thus treated. As the cups or containers pass from the end of the belt or container 22 they are reversed and are allowed to drop through the guide member or tube 10 with their closed ends lowermost so that when received in the rack they will be in nested form. As has been previously stated the receptacles or containers may be removed from the compartments of the rack, in their nested form, and delivered to a carton or like container for shipment or use. As shown more particularly in Fig. 1 of the drawings the entire treating or coating zone $a$ is encased so as to retain the heat. Vertically extending plates 236 enclose the mechanism beneath the plates 51 and 146 whereas a cover member 237 is supported on top of the treating or coating zone structure and encloses the rotatable plate 54 and the upper portion of the revolving turret 96 as shown more particularly in Figs. 6 and 7 of the drawings. The cover member is provided with a top consisting of the sections 238 and 239 hingedly connected at 240 and each of the sections is provided with a handle 241 whereby the same may be raised and lowered. The cover member as an entirety may be removed when desired and the vertically extending plates 236 may also be removed to gain access to the operating mechanism. The cover member 237 is shown removed in Fig. 3 and the vertically extending plates 236 are shown removed in Figs. 6, 7, 8 and 9 of the drawings so that the parts may be more readily observed.

From the above detailed description it is thought that the construction and operation of my machine will be clearly understood but I will endeavor to give a brief description of operation to more clearly set forth the progressive steps. The containers or receptacles are delivered onto the conveyor 18 by the member 41 and the conveyor or belt 18 carries them into position to be engaged by the arms 55 of the rotatable plate 54 and by which they are transferred onto the rotatable turret 96 which carries them into position to receive the coating composition which is supplied through means of two spray nozzles 197 and 203, the spray nozzle 187 directing the composition exteriorly of the cup or receptacle whereas the nozzle 203 discharges interiorly thereof. As the hot composition is ejected from the nozzle the cooler atmosphere affects the same so that when received upon the container or receptacle it is in a powdered or flaky form but in such form as to adhere to the surfaces against which it is ejected. The containers or receptacles during the time that they are positioned for receiving the coating are rapidly rotated so that the coating is evenly distributed over all surfaces thereof. If desired, the supply of composition to either one of the spraying nozzles may be cut off so that the receptacle or container will be coated only exteriorly or interiorly as desired. After being treated or coated the receptacles or containers are carried to a position where they are removed from the turret by engagement of the arms 55 of the rotatable plate 54 and are carried and positioned upon two belts or conveyors which convey them through a heating tunnel. The belts or conveyors are operated at different speeds so that a rotatable movement is given to the receptacles or containers during the time that they are passing through the heating tunnel. As the cups or receptacles pass through the heating tunnel the coating composition is so heated that it will flow for even distribution over all surfaces of the container or receptacle. From the heating tunnel the receptacles or containers are conveyed to a receiving rack from which they may be removed to be placed in cartons or the like. Sufficient time is allowed between the time that the receptacles or containers leave the heating tunnel until they are received in the rack so that the coating composition will be allowed to sufficiently cool that the receptacles or containers will not stick together after being received, in nested form, in the rack. It will also be noted that I have provided a main supply tank or receptacle 131 in which the paraffin or similar material to form the coating composition is initially placed in cake or like form and from which it is delivered, after being heated, to a pan and finally into a container from which it is pumped to the spraying nozzles and to heaters, one of the heaters being positioned beneath the plate 51 which receives the containers or receptacles and the other being positioned in the pan 143. The machine is preferably electrically operated through suitable electric motors and electric heaters 133 and 159 are positioned respectively in the containers 131 and 156. Electricity is further used for heating the tunnel. The electric motors and the electric heaters are controlled by switches carred by the switch box 137. A detailed description of the wiring circuit has not been thought necessary as it forms no part of the present invention. At 170 I have shown a key whereby the pulley 116 may be connected or disconnected to or from the shaft 114 which operates the pump 163. This will be of particular advantage in that at times in starting or stopping the machine it will be necessary or advisable to operate the parts separately.

Having fully described my invention what I claim as new and desire to secure by Letters Patent is:—

1. A coacting machine of the character described including a rotatable member formed with a surface to receive the articles to be coated, an article carrier supported by and movable with the rotatable member, means controlled by the rotation of the member for engaging the carrier with the article to raise and support the same above the receiving surface of the rotatable member, and means for coating the article while supported upon the carrier.

2. A coating machine of the character described including a member formed with a surface to receive the articles to be coated, a plurality of article carriers supported by and movable relative to the member, means for successively operating the carriers to engage the same with the articles to raise and support them above the receiving surface of the member, and means for coating the articles while supported by the carriers.

3. A coating machine of the character described including a rotatable member formed with a surface to receive the articles to be coated, a plurality of article carriers supported by and movable relative to the member, means controlled by the rotation of the member for raising and lowering the carriers to engage the same with the articles or to disengage them therefrom, the articles being raised from the surface of the rotatable member when the carriers are raised, and means for coating the articles while in raised position.

4. A coating machine of the character described including a rotatable member formed with a surface to receive the articles to be coated, a plurality of article carriers supported by and movable relative to the member, means controlled by the rotation of the member for successively raising and lowering the carriers to engage the same with the articles or to disengage them therefrom, the articles being raised from the surface of the rotatable member when the carriers are raised and means for coating the articles while in raised position.

5. A coating machine of the character described including a member formed with a surface to receive the articles to be coated, an article carrier supported by and movable relative to the member, means for raising the carrier to raise and support the article from the receiving surface, means for rotating the carrier and supported article when in raised position, and means for coating the article during such rotation.

6. A coating machine of the character described including a member formed with a surface to receive the articles to be coated, an article carrier supported by and movable relative to the member, means for raising the carrier to raise and support the article from the receiving surface, means for rotating the carrier and supported article when in raised position, means for coating the article during such rotation, and means for stopping the rotation of the carrier and article after the article has been coated.

7. A coating machine of the character described including a rotatable member adapted to receive the articles to be coated, an article carrier supported by and operable with the rotatable member, means for raising the article carrier to engage and support the article, a belt positioned adjacent to the rotatable member and adapted to be engaged for rotating the article carrier and article supported thereby, and means for coating the article during the rotation thereof.

8. A coating machine of the character described including a coating zone, means for coating articles within said zone, a heated tunnel, means for conveying the articles from the coating zone and through the tunnel, and means for engaging and guiding the articles during their passage through the tunnel.

9. A coating machine of the character described including a coating zone, means for coating articles within said zone, a heating zone, and means for conveying the coated articles from the coating zone through the heating zone and horizontally rotating the same during passage through the heating zone.

10. A coating machine of the character described including a coating zone, means for coating articles within said zone, a heating zone, and a conveyor for carrying the coated articles from the coating zone through the heating zone, said conveyor being formed and adapted to give a horizontally rotative movement to the articles as they pass through the heating zone.

11. A coating machine of the character described including a coating zone, means for coating articles within said zone, a heating zone, and a two-part conveyor for carrying the coated articles from said coating zone through the heated zone, one part of said conveyor being operable at a greater speed than the other part thereof so as to give a rotative movement to the articles as they pass through the heated zone.

12. A coating machine of the character described including a coating zone, means for coating articles within said zone, a heating zone, a two-part conveyor for carrying the coated articles from the coating zone through the heating zone, one part of said conveyor being operable at a greater speed than the other part thereof so as to give a rotative movement to the articles during their passage through the heating zone, and means for positioning the articles during their passage through the heating zone, relative to the two parts of the conveyor.

13. A coating machine of the character described including a member having a flange upon which the articles to be coated are received, said flange having openings over which the downwardly turned open ends of the articles are to be positioned, and means for coating the articles both interiorly and exteriorly or either interiorly or exteriorly.

14. A coating machine of the character described including a member having a flange upon which the articles to be coated are received, said flange having openings over which the downwardly turned open ends of the articles are to be positioned, and means for spraying coating composition through the openings of the flange to the interior of the articles.

15. A coating machine of the character described including a coating zone, a conveyor for delivering articles to the coating zone, means for transferring the articles from the conveyor to the coating zone, means for applying a coating composition to the articles, and means positioned adjacent the transfer point of the articles from the carrier to the coating zone to receive a portion of the coating composition for heating at that point.

16. A coating machine of the character described including a coating zone adapted to receive the articles to be coated, means for supplying a coating composition to the articles, and means for receiving the coating composition for supplying heat to a portion of the coating zone.

17. A coating machine of the character described including a coating zone, a conveyor, means for delivering articles to be coated to the conveyor by which they are carried to the coating zone, a heating zone, means for transferring the articles from the conveyor into the coating zone and from the coating zone to the heating zone, means for coating the articles while within the coating zone, a conveyor adapted to carry the coated articles through the heating zone and to deliver the same back to the first mentioned conveyor, a third conveyor adapted to receive the coated articles from the first mentioned conveyor, and means for receiving the coated articles from the third mentioned conveyor.

18. A coating machine of the character described including a conveyor, a rotatable member adapted to receive the articles to be coated from the conveyor, article carriers supported by the rotatable member and adapted for vertical movement relative thereto, a pulley carried by each of the article carriers, means for raising and lowering the article carriers to engage and support the articles, an endless belt positioned relative to the rotatable member to engage the pulleys of the article carriers when in raised position, means for operating the endless belt to impart rotary movement to the article carriers, and means for coating the articles when in raised position.

19. A coating machine of the character described including a conveyor, a rotatable member adapted to receive the articles to be coated from the conveyor, means for coating the articles while on the rotatable member, and a second conveyor to receive the articles from the rotatable member after the same are coated, said second mentioned conveyor being formed and adapted to impart a horizontal rotatable movement to the articles carried thereby.

20. A coating machine of the character described including a rotatable member having a receiving portion for the articles to be coated, means for delivering the articles to the receiving portion of the rotatable member in inverted position with their open ends downward, carriers having head portions adapted to be normally positioned beneath the receiving portion, and means for raising the carriers to position the heads thereof interiorly of the articles to raise and support the same above the receiving portion.

21. A coating machine of the character described including a rotatable member having a receiving portion for the articles to be coated, said receiving portion having circumferentially spaced openings therein, means for delivering the articles to the receiving portion of the rotatable member in inverted position with their open ends over the openings therein, carriers having head portions adapted to be normally positioned beneath the receiving portion and in alignment with the openings therein, and means for raising the carriers through the openings to position the heads thereof interiorly of the articles to raise and support the same above the receiving portion.

22. A coating machine of the character described including a rotatable member having vertically spaced flanges, the lower flange acting as a receiving portion for the articles to be coated, means for delivering the articles to the lower flange in inverted position with their open ends downward, carriers having head portions adapted to be normally positioned beneath the upper surface of the lower flange, means for raising the carriers to position the heads thereof interiorly of the articles to raise and support the same above the lower flange, and depending members carried by the upper flange and adapted to be positioned to hold the articles on the carriers when in raised position.

In testimony whereof I hereunto affix my signature.

HENRY A. STONE.